United States Patent
Fan et al.

(10) Patent No.: US 12,120,063 B2
(45) Date of Patent: Oct. 15, 2024

(54) RESOURCE CONFIGURATION METHOD AND APPARATUS

(71) Applicant: Huawei Technologies Co., Ltd., Shenzhen (CN)

(72) Inventors: Weiwei Fan, Shenzhen (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 17/738,926

(22) Filed: May 6, 2022

(65) Prior Publication Data

US 2022/0263613 A1 Aug. 18, 2022

Related U.S. Application Data

(63) Continuation of application No. PCT/CN2019/116815, filed on Nov. 8, 2019.

(51) Int. Cl.
*H04L 5/00* (2006.01)

(52) U.S. Cl.
CPC ............ *H04L 5/006* (2013.01); *H04L 5/0005* (2013.01); *H04L 5/0051* (2013.01); *H04L 5/0064* (2013.01)

(58) Field of Classification Search
None
See application file for complete search history.

(56) References Cited

U.S. PATENT DOCUMENTS

2014/0226504 A1 8/2014 Tavildar et al.
2022/0361183 A1* 11/2022 Behravan ............... H04W 72/56

FOREIGN PATENT DOCUMENTS

| CN | 105187849 A | 12/2015 | |
|---|---|---|---|
| CN | 105307256 A | 2/2016 | |
| CN | 106162900 A | * 11/2016 | ............ H04W 72/04 |
| CN | 108419295 A | 8/2018 | |
| WO | 2013139041 A1 | 9/2013 | |

(Continued)

OTHER PUBLICATIONS

Peng et al., "Interference avoidance mechanisms in the hybrid cellular and device-to-device systems," XP031659660, Total pp. 617-621, Institute of Electrical and Electronics Engineers, New York, New York (Sep. 13, 2009).

(Continued)

*Primary Examiner* — Brandon M Renner

(74) *Attorney, Agent, or Firm* — Leydig, Voit & Mayer, Ltd.

(57) ABSTRACT

Embodiments of this application provide a resource configuration method and apparatus, so as to improve resource utilization during D2D communication. A first terminal device receives scheduling information that is sent by a network device and that is used to indicate an uplink time-frequency resource used for the first terminal device, and the first terminal device can multiplex the uplink time-frequency resource to send a sidelink signal to a second terminal device when an interference value to the network device during sending of the sidelink signal meets a first rule. Therefore, the uplink time-frequency resource of the first terminal device is multiplexed while interference is considered during sidelink transmission, thereby improving resource utilization.

20 Claims, 8 Drawing Sheets

(56) References Cited

FOREIGN PATENT DOCUMENTS

WO         2017171398 A1     10/2017
WO    WO-2020067682 A1 *   4/2020   .......... H04B 17/318

OTHER PUBLICATIONS

ETRI, "Sidelink Design for NR V2X," 3GPP TSG RAN WG1 Meeting 94, Gothenburg, Sweden, R1-1809498, total 7 pages, 3rd Generation Partnership Project, Valbonne, France (Aug. 20-24, 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.7.0, total 551 pages, 3rd Generation Partnership Project, Valbonne, France (Sep. 2019).

Huawei, HiSilicon, "Power control and power sharing for V2X sidelink," 3GPP TSG RAN WG1 Meeting #96bis, Xi'an, China, R1-1904691, total 6 pages, 3rd Generation Partnership Project, Valbonne, France (Apr. 8-12, 2019).

"3rd Generation Partnership Project; Technical Specification Group Radio Access Network; Evolved Universal Terrestrial Radio Access (E-UTRA); Physical layer procedures (Release 12)," 3GPP TS 36.213 V12.13.0, Chapter 14, total 240 pages, 3rd Generation Partnership Project, Valbonne, France (Sep. 2018).

* cited by examiner

RESOURCE CONFIGURATION METHOD AND APPARATUS

CROSS-REFERENCE TO RELATED APPLICATIONS

This application is a continuation of International Application No. PCT/CN2019/116815, filed on Nov. 8, 2019. The disclosures of the aforementioned application is hereby incorporated by reference in its entirety.

TECHNICAL FIELD

Embodiments of this application relate to the field of communication technologies, and in particular, to a resource configuration method and apparatus applied to sidelink communication.

BACKGROUND

Since 3GPP Release 12, long term evolution (LTE) starts to support device-to-device (D2D) communication or sidelink communication in a cellular network. To avoid a conflict between the D2D communication and existing universal user (Uu) communication, a network device configures, by using radio resource control (RRC) signaling, some common time-frequency resources used for the D2D transmission. Specifically, the network device configures a resource pool used for the D2D communication. A time-frequency resource that is not used for sidelink communication may be used for transmission between the network device and a terminal, namely, the Uu transmission. However, when the resource pool is applied to the D2D communication, there may be a problem of relatively low resource utilization.

SUMMARY

Embodiments of this application provide a resource configuration method and apparatus, so as to improve resource utilization during D2D communication.

According to a first aspect, an embodiment of this application provides a resource configuration method. The method includes: A first terminal device receives scheduling information sent by a network device, where the scheduling information is used to indicate an uplink time-frequency resource. The first terminal device sends a sidelink signal to a second terminal device on the uplink time-frequency resource when an interference value to the network device during sending of the sidelink signal meets a first rule. According to the method provided in this embodiment of this application, through interference control over Uu transmission, a terminal device can multiplex, for sidelink transmission, an uplink time-frequency resource of the Uu transmission, thereby improving resource utilization.

In a possible design, the interference value may be determined based on an attenuation amount of a channel between the network device and the first terminal device and a transmit power for sending the sidelink signal by the first terminal device. In the foregoing design, an interference value from the sidelink transmission to the Uu transmission may be accurately estimated with reference to the attenuation amount of the channel and the transmit power of the sidelink signal during the Uu transmission, so that the sidelink transmission may be controlled based on the interference value to multiplex the uplink time-frequency resource of the Uu transmission.

In a possible design, the attenuation amount of the channel between the network device and the first terminal device may be determined based on a transmit power of the network device and a downlink received signal power of the first terminal device. The downlink received signal power is obtained through measurement based on a demodulation reference signal (DMRS) corresponding to the scheduling information. In the foregoing design, the attenuation amount of the channel may be inferred by using the transmit power and receive power during the Uu transmission.

In a possible design, the first rule may be that the interference value is less than an interference threshold. By using the foregoing design, a problem that communication quality of the Uu transmission is degraded because the uplink time-frequency resource of the Uu transmission is multiplexed by the sidelink transmission may be avoided.

In a possible design, the first rule may alternatively be that the interference value is less than or equal to an interference threshold. By using the foregoing design, a problem that communication quality of the Uu transmission is degraded because the uplink time-frequency resource of the Uu transmission is multiplexed by the sidelink transmission may be avoided.

In a possible design, the first rule may alternatively be that the interference value is within a preset range. By using the foregoing design, a problem that communication quality of the Uu transmission is degraded because the uplink time-frequency resource of the Uu transmission is multiplexed by the sidelink transmission may be avoided.

In a possible design, the interference threshold may be carried in the scheduling information. In the foregoing manner, a base station may dynamically adjust the interference threshold based on a priority of scheduled uplink data, so that a resource multiplexing status between the Uu transmission and the sidelink transmission can be flexibly controlled.

In a possible design, the interference threshold is determined based on a first priority and a second priority, the first priority is a priority of uplink data transmitted on the uplink time-frequency resource, and the second priority is a priority of sidelink data sent by the first terminal device to the second terminal device. By using the foregoing design, transmission quality of data with a relatively high priority can be ensured.

In a possible design, the uplink time-frequency resource is on an unlicensed frequency band. When sending the sidelink signal to the second terminal device on the uplink time-frequency resource, the first terminal device may send the sidelink signal to the second terminal device on the uplink time-frequency resource after listen before talk (LBT) succeeds on the uplink time-frequency resource. In the foregoing manner, the sidelink transmission may be performed by multiplexing the uplink time-frequency resource of the Uu transmission on the unlicensed frequency band.

In a possible design, the first terminal device is located in one or more terminal device groups, and the scheduling information carries an identifier of the one or more terminal device groups, where the identifier is used to indicate a terminal device group that multiplexes the uplink time-frequency resource. In the foregoing design, a quantity of terminal devices that multiplex the uplink time-frequency resource of the Uu transmission may be controlled by indicating, in the scheduling information, a terminal device group that is allowed to multiplex the uplink time-frequency resource of the Uu transmission, so that the following problem may be avoided: Because the quantity of terminal devices that multiplex the uplink time-frequency resource of the Uu transmission is relatively large, and a total value of interference values of the terminal devices to the Uu transmission is relatively large, the communication quality of the Uu transmission is affected.

In a possible design, the first terminal device may send the sidelink signal to the second terminal device on the uplink time-frequency resource when the interference value to the network device during sending of the sidelink signal meets the first rule and a priority of the first terminal device meets a second rule. In the foregoing design, the second rule may be set to control the quantity of terminal devices that multiplex the uplink time-frequency resource of the Uu transmission, so that the following problem may be avoided: Because a quantity of terminal devices that multiplex the uplink time-frequency resource of the Uu transmission is relatively large, and a total value of interference values of the terminal devices to the Uu transmission is relatively large, the communication quality of the Uu transmission is affected.

In a possible design, the priority of the first terminal device may be a device priority of the first terminal device, and the device priority is determined based on one or more of the following factors: a priority of a service transmitted through a sidelink by the terminal device; a geographical location of the terminal device; and a communication fee of the terminal device. In the foregoing design, a priority of a terminal device is determined based on the service of the sidelink transmission, the geographical location of the terminal device, the communication fee of the terminal device, and the like, and this can better ensure communication quality of some terminal devices, for example, some terminal devices with a relatively high priority of a service transmitted through a sidelink, a relatively close geographical location, and a relatively high communication fee.

In a possible design, the priority of the first terminal device may alternatively be a priority of data transmitted by the first terminal device to the second terminal device. By using the foregoing design, transmission of data with a high priority can be better ensured.

In a possible design, the scheduling information may carry a priority indication. The second rule may be that the priority of the first terminal device is greater than or equal to the priority indication. In the foregoing design, the priority indication may be dynamically indicated by the network device to the terminal device, so that the network device may dynamically adjust the priority indication based on a requirement. For example, the network device may dynamically adjust the priority indication based on the priority of the scheduled uplink data. Compared with a fixed priority indication, the foregoing manner may flexibly control the quantity of terminal devices that multiplex the uplink time-frequency resource of the Uu transmission.

In a possible design, a frame structure of the uplink time-frequency resource may not be fixed. A communication opportunity in an unlicensed frequency band depends on whether LBT succeeds. In the foregoing design, an unfixed downlink and uplink time slot configuration of a first time-frequency resource that has an unfixed frame structure and that is indicated by the scheduling information is more flexible, and uplink and downlink slots of the first time-frequency resource may be independently determined by a transmit end (a network device or a terminal device) based on factors such as service load, and the unfixed frame structure may be better applicable to an unlicensed frequency band than the fixed frame structure.

According to a second aspect, an embodiment of this application provides a resource configuration apparatus. The apparatus includes a communication module. The communication module is configured to: receive DMRS scheduling information sent by a network device, where the scheduling information is used to indicate an uplink time-frequency resource; and send a sidelink signal to a second terminal device on the uplink time-frequency resource when an interference value to the network device during sending of the sidelink signal meets a first rule.

In a possible design, the interference value may be determined based on an attenuation amount of a channel between the network device and a first terminal device and a transmit power for sending the sidelink signal by the communication module.

In a possible design, the attenuation amount of the channel between the network device and the first terminal device may be determined based on a transmit power of the network device and a downlink received signal power of the apparatus. The downlink received signal power is obtained through measurement based on a DMRS corresponding to the scheduling information.

In a possible design, the first rule may be that the interference value is less than an interference threshold.

In a possible design, the interference threshold may be carried in the scheduling information.

In a possible design, the interference threshold may be determined based on a first priority and a second priority, the first priority is a priority of uplink data transmitted on the uplink time-frequency resource, and the second priority is a priority of sidelink data sent by the communication module to the second terminal device.

In a possible design, the uplink time-frequency resource is on an unlicensed frequency band. The communication module may be specifically configured to: when sending the sidelink signal to the second terminal device on the uplink time-frequency resource, send the sidelink signal to the second terminal device on the uplink time-frequency resource after LBT succeeds on the uplink time-frequency resource.

In a possible design, the first terminal device is located in one or more terminal device groups, and the scheduling information may carry an identifier of one or more terminal device groups, where the identifier is used to indicate a terminal device group that multiplexes the uplink time-frequency resource.

In a possible design, the communication module is specifically configured to: when sending the sidelink signal to the second terminal device on the uplink time-frequency resource, send the sidelink signal to the second terminal device on the uplink time-frequency resource when the interference value to the network device during sending of the sidelink signal meets the first rule and a priority of the first terminal device meets a second rule.

In a possible design, the priority of the first terminal device is a device priority of the first terminal device, and the device priority is determined based on one or more of the following factors: a priority of a service transmitted through a sidelink by the terminal device; a geographical location of the terminal device; and a communication fee of the terminal device.

In a possible design, the priority of the first terminal device is a priority of data transmitted by the first terminal device to the second terminal device.

In a possible design, the scheduling information carries a priority indication. The second rule is that the priority of the first terminal device is greater than or equal to the priority indication.

In a possible design, a frame structure of the uplink time-frequency resource is not fixed.

In a possible design, the communication module includes an interface or a transceiver.

In a possible design, the apparatus is a chip.

In a possible design, the apparatus is the first terminal device.

According to a third aspect, this application provides a resource configuration apparatus, where the apparatus may be a terminal device, or may be a chip or a chip set in the terminal device. The apparatus may include a processing module and a transceiver module. When the apparatus is a terminal device, the processing module may be a processor, and the transceiver module may be a transceiver. The apparatus may further include a storage module, and the storage module may be a memory. The storage module is configured to store instructions, and the processing module executes the instructions stored in the storage module, so that the terminal device performs a corresponding function in the first aspect. When the apparatus is a chip or a chip set in the terminal device, the processing module may be a processor, and the transceiver module may be an input/output interface, a pin, a circuit, or the like. The processing module executes the instructions stored in the storage module, so that the terminal device performs a corresponding function in the first aspect. The storage module may be a storage module (for example, a register or a cache) in the chip or the chip set, or may be a storage module (for example, a read-only memory or a random access memory) located outside the chip or the chip set in the terminal device.

According to a fourth aspect, an embodiment of this application provides a computer storage medium, where the computer storage medium stores program instructions, and when the program instructions are run on a communication device, the communication device is enabled to perform the method in any one of the first aspect or the possible designs of the first aspect in embodiments of this application.

According to a fifth aspect, an embodiment of this application provides a computer program product. When the computer program product runs on a communication device, the communication device is enabled to perform the method in any one of the first aspect or the possible designs of the first aspect in embodiments of this application.

According to a sixth aspect, an embodiment of this application provides a chip. The chip is coupled to a memory, to perform the method in any one of the first aspect and the possible designs of the first aspect in embodiments of this application.

In addition, for the technical effects produced by the second aspect to the sixth aspect, refer to the descriptions in the first aspect. Details are not described herein again.

It should be noted that "coupling" in embodiments of this application indicates a direct combination or an indirect combination between two components.

DESCRIPTION OF EMBODIMENTS

Figure 1:
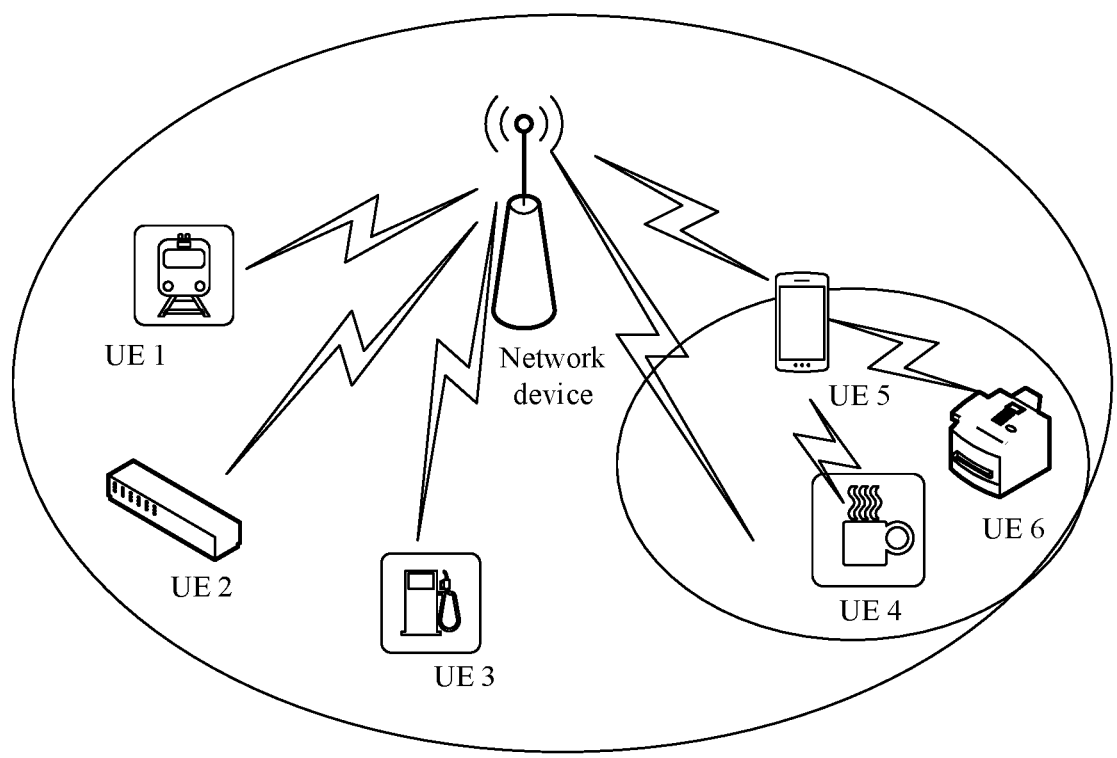
FIG. 1 is a schematic architectural diagram of a communication system according to this application.

A method for indicating signal transmission provided in this application may be applied to a 5G new radio (NR) unlicensed system, or may be applied to another communication system, which may be, for example, an internet of things (IoT) system, a vehicle-to-everything (V2X) system, a narrow band internet of things (NB-IoT) system, or an LTE system, or may be a fifth generation (5G) communication system, or may be a hybrid architecture of LTE and 5G, or may be a 5G NR system, or a new communication system that will emerge in future communication development. As long as an entity in the communication system needs to send frame signal (burst) resource indication information and a related parameter that are used for D2D transmission, and another entity needs to receive the indication information, and determine a resource location and a sending procedure of the D2D transmission according to the indication information, the method for indicating signal transmission provided in embodiments of this application may be used.

A terminal in embodiments of this application is an entity on a user side that is used to receive or transmit a signal. The terminal is a device that provides the user with voice and/or data connectivity, for example, a handheld device or a vehicle-mounted device having a wireless connection function. The terminal may alternatively be another processing device connected to a wireless modem. The terminal may communicate with one or more core networks via a radio access network (RAN). The terminal may also be referred to as user equipment (UE), a wireless terminal, a subscriber unit, a subscriber station, a mobile station, a mobile console (mobile), a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). Common terminal devices include, for example, a mobile phone, a tablet computer, a notebook computer, a palmtop computer, a mobile internet device (MID), a wearable device such as a smartwatch, a smart band, or a pedometer, and a smart appliance such as a smart refrigerator or a smart washing machine. However, embodiments of this application are not limited thereto.

A network device in embodiments of this application is an entity on a network side that is used to transmit or receive a signal. For example, the network device may be an evolved NodeB (evolutional Node B, eNB or e-NodeB) in LTE, a new radio controller (NR controller), a gNodeB (gNB) in a 5G system, a centralized network element (centralized unit), a new radio base station, a radio remote module, a micro base station, a relay, a distributed network element (distributed unit), a transmission reception point (TRP), a transmission point (TP), or any other radio access device. However, embodiments of this application are not limited thereto.

FIG. 1 shows a communication system according to an embodiment of this application. The communication system includes a network device and six terminal devices. UE 1 to UE 6 are used as an example. In the communication system, the UE 1 to the UE 6 may send a signal to a network device on an uplink, and the network device may receive an uplink signal sent by the UE 1 to the UE 6. In addition, a communication subsystem may alternatively include the UE 4 to the UE 6. The network device may send a downlink signal to the UE 1, the UE 2, the UE 3, and the UE 5 on a downlink. The UE 5 may send a signal to the UE 4 and the UE 6 by using a sidelink (SL) based on a D2D technology. FIG. 1 is merely a schematic diagram. This application imposes no specific limitation on a type of the communication system, a quantity and types of devices included in the communication system, and the like.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

A D2D communication technology is a communication manner in which communication is directly performed between two peer user nodes. D2D communication has different applications in different networks, such as Wi-Fi Direct in a Wi-Fi network or a Bluetooth technology (short range time division duplex communication). As a key technology in a 4G technology, the D2D communication is always of great concern. The 3rd Generation Partnership Project (3GPP) introduces an LTE-D2D/V2X technology and an LTE-V2X (Vehicle to everything) technology into LTE, and further applies the D2D communication technology to an internet of vehicles for vehicle-to-vehicle communication. The D2D is intended to enable user communication devices within a specific distance to communicate directly, so as to reduce load on a serving base station. In R15, the 3GPP starts to study a 5G technology. An access network technology of the 5G technology is referred to as NR, which is intended to provide a higher communication rate and a larger access quantity than the 4G technology. To enhance the LTE-V2X technology, the 3GPP organization is also dedicated to studying an NR-V2X technology. An operating frequency band in the D2D technology may be divided into a licensed frequency band on which a D2D technology such as LTE-D2D/V2X or NR-V2X operates and an unlicensed frequency band on which a D2D technology such as Wi-Fi Direct or a Bluetooth technology operates.

In the unlicensed frequency band, a transmit node needs to access a channel in a contention manner, to be specific, before the channel is accessed, LBT needs to be performed. The transmit node can access a channel for signal transmission only when a channel is idle. Therefore, compared with a licensed frequency band, communication in an unlicensed frequency band is uncertain to some extent. The uncertainty is caused by an idle state of the channel, and fairness of accessing the channel by a user in the frequency band can be ensured in a contention manner.

Figure 2:
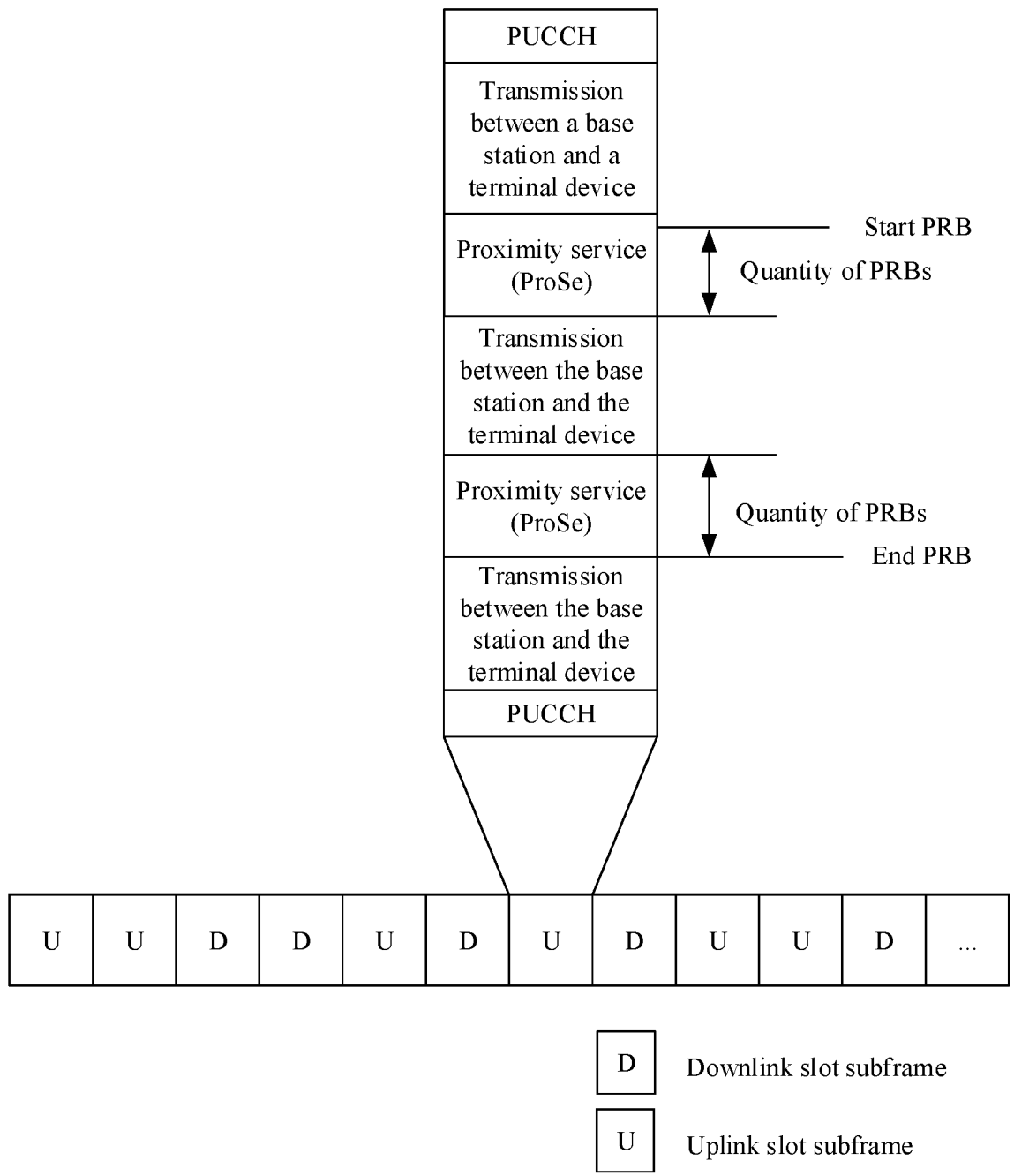
FIG. 2 is a schematic diagram of a D2D transmission resource configuration method according to this application.

Since 3GPP Release 12, LTE starts to support device-to-device communication, which is briefly referred to as D2D or sidelink communication, in a cellular network. To avoid a conflict between the D2D communication and existing Uu communication, a standard specifies a resource pool used for the D2D communication, to be specific, a network device configures, by using RRC signaling, some common time-frequency resources used for the D2D transmission. As shown in FIG. 2, a slot used for the D2D transmission is distributed in subframes of an uplink slot. In a subframe used for the D2D transmission, a frequency resource used for sidelink transmission is divided into two subbands. In one subband, a frequency start point of the subband is indicated by using a start physical resource block (PRB) (namely, PRB-Start), and in the other subband, a frequency end point of the other subband is indicated by using an end PRB (namely, PRB-End). A frequency width of each of the subbands is represented by a quantity of PRBs (PRB-number). A time-frequency resource that is not used for sidelink communication may be used for transmission between the network device and a terminal, namely, the Uu transmission.

Embodiments of this application provide a resource configuration method and apparatus, so as to improve communication efficiency when a D2D device multiplexes an uplink transmission resource of the Uu transmission. The method and the apparatus are based on a same concept. Because a problem-resolving principle of the method is similar to that of the apparatus, mutual reference may be made to implementations of the apparatus and the method. Repeated parts are not described in detail.

A terminal device may receive a sidelink signal (such as a physical sidelink shared channel (PSSCH)) sent by one or more other terminal devices. In the following, a terminal device that receives a sidelink signal is referred to as a receiving device, and a terminal device that sends a sidelink signal is referred to as a sending device. In other words, a receiving device may receive a sidelink signal sent by one or more other sending devices. It should be understood that the sending device and the receiving device are relative terms, the sending device may further have a receiving function, and the receiving device may further have a sending function.

In embodiments of this application, a first terminal device may be a sending device, and a second terminal device may be a receiving device.

When the receiving device communicates with the sending device, the two terminal devices may communicate directly with each other, and do not require the network device to perform forwarding. For example, a manner in which the receiving device communicates with the sending device may be referred to as D2D transmission, or may be referred to as sidelink communication, or may be referred to as another name. This is not specifically limited herein.

It should be understood that, in embodiments of this application, "at least one" means one or more, and "a plurality of" means two or more. "At least one (piece) of the following" or a similar expression thereof indicates any combination of the following items, and includes any combination of one or more of the following. For example, at least one (piece) of a, b, or c may indicate a, b, c, a and b, a and c, b and c, or a, b, and c, where a, b, and c may be singular or plural.

In addition, it should be understood that, in descriptions of this application, terms such as "first" and "second" are merely used for distinction and description, but cannot be understood as an indication or implication of relative importance, or cannot be understood as an indication or implication of a sequence.

The following describes in detail a resource configuration method provided in the embodiments of this application with reference to the accompanying drawings.

Figure 3:
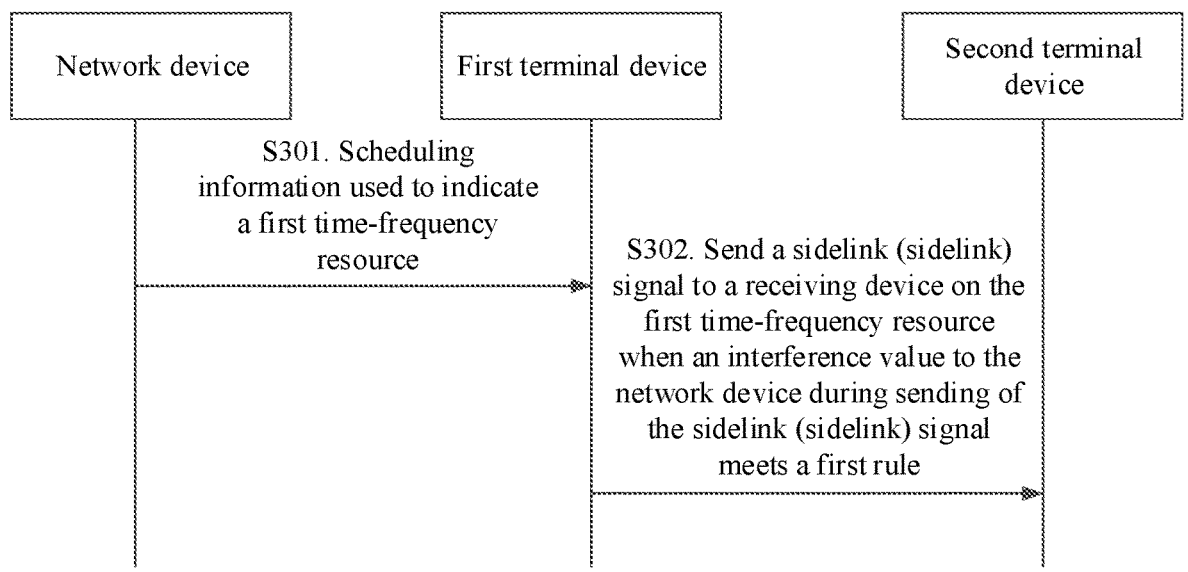
FIG. 3 is a schematic flowchart of a resource configuration method according to this application.

FIG. 3 is a flowchart of a resource configuration method according to this application. The method includes the following steps.

S301. A network device sends scheduling information, where the scheduling information is used to indicate a first time-frequency resource. Correspondingly, a sending device receives the scheduling information sent by the network device.

It may be understood that communication between the network device and a terminal device may be understood as Uu communication (or may be referred to as Uu transmission). The first time-frequency resource indicated by the scheduling information may be a Uu transmission resource. Uplink data may be understood as data sent by the terminal device to the network device during the Uu transmission.

In an example description, the scheduling information may be a group common (GC) physical downlink control channel (PDCCH), or the scheduling information may be carried in a group common physical downlink control channel (GC-PDCCH). For ease of description, the following uses the GC-PDCCH as an example for description.

In an implementation, the first time-frequency resource may be an uplink time-frequency resource allocated to the terminal device by the network device. Specifically, the uplink time-frequency resource may be an uplink time-domain resource, such as an uplink slot.

Figure 4A:
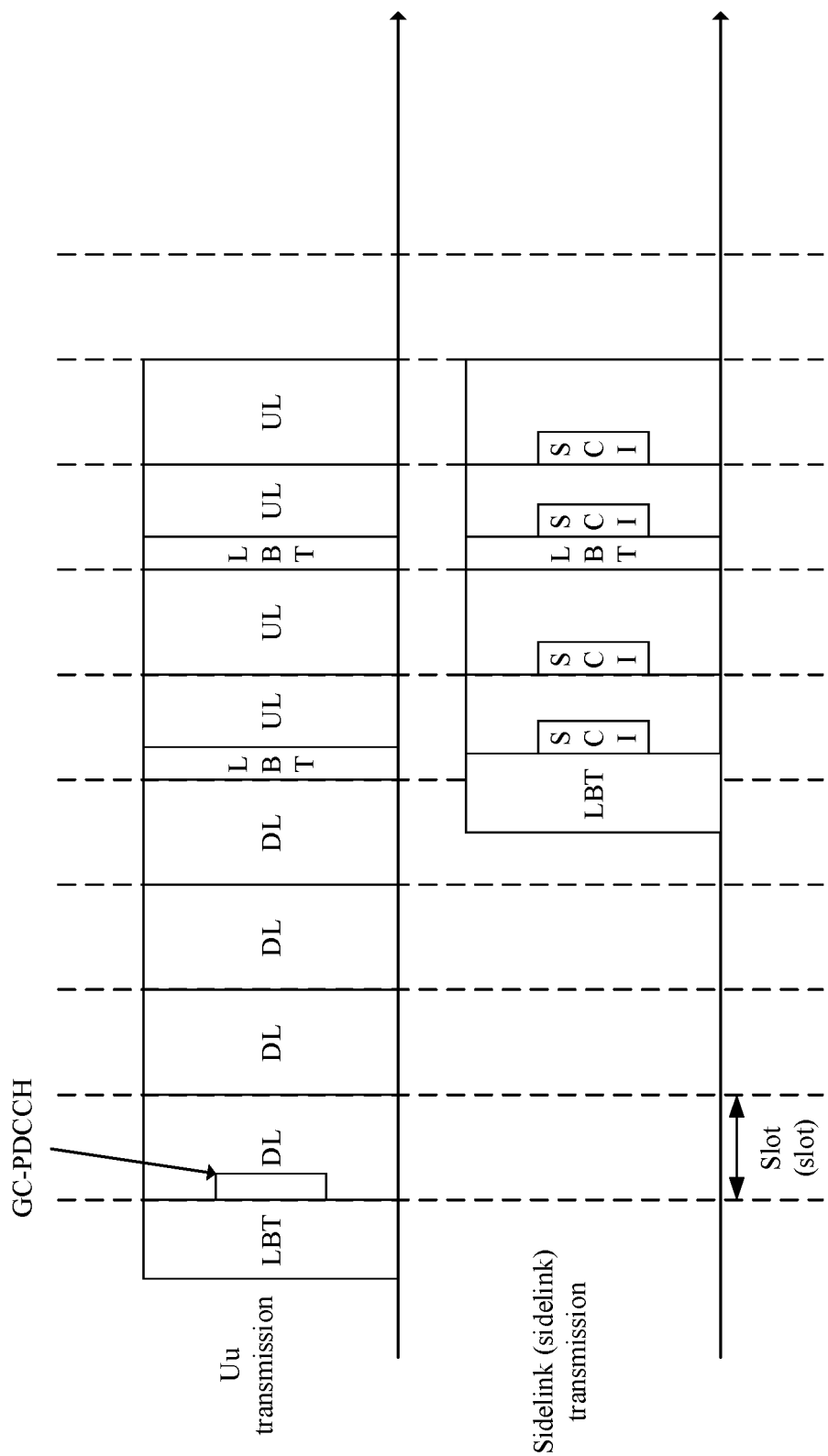
FIG. 4A is a schematic diagram of sending a GC-PDCCH according to this application.
Figure 4B:
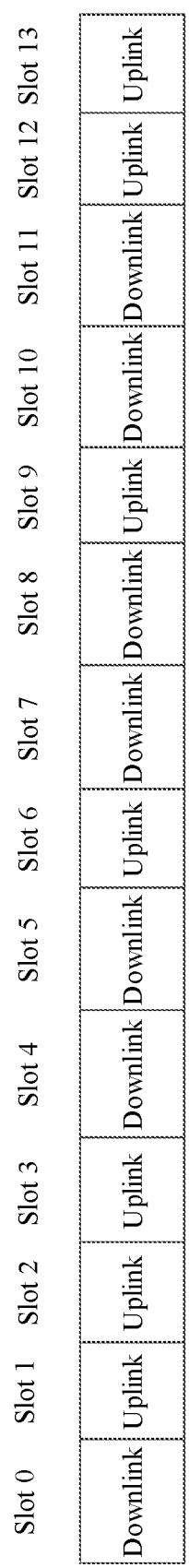
FIG. 4B is a schematic diagram of indicating locations of uplink slots and downlink slots for a GC-PDCCH according to this application.

In a possible implementation, a frame structure of the first time-frequency resource indicated by the GC-PDCCH may not be fixed. For example, the GC-PDCCH may carry COT frame structure information to indicate location information of uplink slots and downlink slots, so as to indicate an uplink slot. For example, the GC-PDCCH indicates that a slot 0 is a downlink slot, a slot 1 to a slot 3 are uplink slots, a slot 4 and a slot 5 are downlink slots, a slot 6 is an uplink slot, a slot 7 and a slot 8 are downlink slots, a slot 9 is an uplink slot, a slot 10 and a slot 11 are downlink slots, and a slot 12 and a slot 13 are uplink slots, as shown in FIG. 4B.

In an example description, the GC-PDCCH may indicate the location information of the uplink slots and downlink slots by using a bit map. For example, "1" may be used to represent a downlink slot, and "0" may be used to represent an uplink slot. For another example, "0" may be used to represent a downlink slot, and "1" may be used to represent an uplink slot. For example, "0" is used to represent a downlink slot, and "1" is used to represent an uplink slot. The GC-PDCCH may indicate, by using "01110010010011", locations of uplink slots and downlink slots shown in FIG. 4B.

A communication opportunity in an unlicensed frequency band depends on whether LBT succeeds. In this embodiment of this application, an unfixed downlink and uplink time slot configuration of a first time-frequency resource that has an unfixed frame structure and that is indicated by the scheduling information is more flexible, and uplink and downlink slots of the first time-frequency resource may be independently determined by a transmit end (a network device or a terminal device) based on factors such as service load, and the unfixed frame structure may be better applicable to an unlicensed frequency band than the fixed frame structure.

In an implementation, after LBT succeeds, the network device may obtain a channel occupancy time (COT) time-frequency resource for performing Uu transmission. The network device may send the GC-PDCCH on the COT, for example, may send the GC-PDCCH on an earliest time unit of the COT, as shown in FIG. 4A. For example, the time unit may be a symbol, a slot, a mini-slot, or a subframe. It should be understood that FIG. 4A is merely an example description. In specific implementation, a location of an uplink slot and a location of a downlink slot in Uu transmission may alternatively be other locations. A sending period of SCI in sidelink transmission is not limited to one slot. In specific implementation, the sending period of the SCI in the sidelink transmission may alternatively be another sending period. For example, the sending period of the SCI is two slots or four slots, to be specific, SCI is sent once every two slots, and SCI is sent once every four slots.

In an implementation, a bandwidth part (BWP), of the terminal device, used for the sidelink transmission may be a BWP the same as a BWP used for the Uu transmission. Therefore, the terminal device may simultaneously perform sidelink transmission and Uu transmission on the BWP, and may further listen to a GC-PDCCH signal in configured GC-PDCCH search space while listening to a sidelink signal. By listening to the GC-PDCCH that is used to schedule a resource of the Uu transmission, the terminal device may obtain a location of the first time-frequency resource, so that the resource of the Uu transmission may be multiplexed during sidelink transmission.

S302. The sending device sends a sidelink signal to a receiving device on the first time-frequency resource when an interference value to the network device during sending of the sidelink signal meets a first rule. Correspondingly, the receiving device may detect, on the first time-frequency resource, the sidelink signal sent by the sending device.

According to the method provided in this embodiment of this application, through interference control over Uu transmission, a terminal device can multiplex, for sidelink transmission, a first time-frequency resource of the Uu transmission, thereby improving resource utilization. In addition, a frame structure of the first time-frequency resource indicated by the scheduling information in this embodiment of this application may not be fixed, and may be better applicable to an unlicensed frequency band.

In some embodiments, whether the terminal device performs resource multiplexing on the first time-frequency resource of the Uu transmission may depend on a capability of the terminal device. After correctly detecting the GC-PDCCH, the sending device having a capability of multiplexing the first time-frequency resource of the Uu transmission may send a signal to the receiving device on the first time-frequency resource when the interference value to the network device during sending of the sidelink signal meets the first rule. After correctly decoding the GC-PDCCH, the receiving device having the capability of multiplexing the first time-frequency resource of the Uu transmission may detect the sidelink signal on the first time-frequency resource indicated by the GC-PDCCH. For example, the receiving device may detect, on the first time-frequency resource indicated by the GC-PDCCH, whether sidelink control information (SCI) signaling exists, so as to receive the sidelink signal.

When performing D2D pairing, the network device may further indicate, by using higher layer signaling (for example, RRC signaling) based on capabilities of both pairing parties, namely, the sending device and the receiving device, whether the sending device and the receiving device enable Uu and SL resource multiplexing. Specifically, if one of the parties does not have the capability of multiplexing the first time-frequency resource of the Uu transmission, the Uu and SL resource multiplexing may not be enabled. If both the sending device and the receiving device have the capability of multiplexing the first time-frequency resource of the Uu transmission, the Uu and SL resource multiplexing may be enabled. Therefore, the terminal device may determine, under an indication of the network device, whether to multiplex Uu and SL resources. For example, it is assumed that a terminal device 1 has the capability of multiplexing the first time-frequency resource of the Uu transmission, and a terminal device 2 does not have the capability of multiplexing the first time-frequency resource of the Uu transmission. When pairing the terminal device 1 with the terminal device 2, the network device may indicate the terminal device 1 and the terminal device 2 not to enable Uu and SL resource multiplexing. Therefore, when performing sidelink communication with the terminal device 2, the terminal device 1 does not multiplex the first time-frequency resource of the Uu transmission.

For discontinuous uplink slots, it may also be understood that uplink slots indicated by the GC-PDCCH are discontinuous, and the terminal device may avoid sending a sidelink signal to the receiving device in an idle slot (which may also be referred to as a gap slot) in the uplink slots. In the foregoing method, when multiplexing the first time-frequency resource of the Uu transmission, the terminal device avoids the gap slot. In an unlicensed frequency band, the terminal device performs LBT on the gap slot before sending an uplink signal on a Uu resource. In this manner, interference from another terminal device to LBT during the uplink transmission can be reduced.

In an implementation, for discontinuous uplink slots, it may also be understood that uplink slots indicated by the GC-PDCCH are discontinuous in one slot. For example, as shown in FIG. 4B, the slot 1 and the slot 2 are uplink slots, the slot 6 is an uplink slot, the slot 9 is an uplink slot, and the slot 12 and the slot 13 are uplink slots. The terminal device may select a plurality of segments of uplink slots or a plurality of uplink slots for resource multiplexing. For example, as shown in FIG. 4B, the slot 1 to the slot 3 are one segment of uplink slots, the slot 6 is one uplink slot, the slot 9 is one uplink slot, and the slot 12 and the slot 13 are one segment of uplink slots. For example, in FIG. 4B, the terminal device may select the slot 1 to the slot 3, the slot 6, and the slot 9 to perform resource multiplexing, so that the terminal device performs LBT before the slot 1 to the slot 3. If the LBT succeeds, the slot 1 to the slot 3 are multiplexed to send a sidelink signal. If the LBT fails, the terminal device may continue to perform LBT before the slot 6. If the LBT succeeds before the slot 6, the slot 6 is multiplexed to send a sidelink signal. If the LBT fails, the LBT may continue to be performed before the slot 9.

That the sending device performs resource multiplexing on the uplink slot may be understood as sending a sidelink signal to the receiving device in a slot used for uplink transmission in the Uu transmission. That the receiving device performs resource multiplexing on the uplink slot may be understood as receiving, in a slot used for uplink transmission in the Uu transmission, a sidelink signal sent by the sending device.

In an implementation, if the first time-frequency resource is on an unlicensed frequency band, before the sending device sends a signal to the receiving device on the first time-frequency resource, LBT may be performed. After the LBT succeeds, a signal is sent to the receiving device on the first time-frequency resource.

In some embodiments, the interference value may be determined based on an attenuation amount of a channel between the network device and the sending device and a transmit power for sending the sidelink signal by the sending device.

Further, the attenuation amount of the channel between the network device and the sending device may be determined based on a transmit power of the network device and a downlink received signal power of the sending device. The downlink received signal power is obtained through measurement based on a DMRS corresponding to the scheduling information. For example, the sending device may detect reference signal received power (RSRP) of a DMRS corresponding to the GC-PDCCH, and the downlink received signal power may be the RSRP of the DMRS corresponding to the GC-PDCCH.

In an example description, the interference value may meet the following formula: Interference_from_D2D=Uu DL RSRP+sidelink_Tx−Tx Power, where Interference_from_D2D represents the interference value, Uu_DL_RSRP represents the downlink received signal power, sidelink_Tx represents the transmit power for sending the sidelink signal by the sending device, and Tx Power represents the transmit power of the network device.

Alternatively, it may be understood that the interference value may be determined by using Interference_from_D2D=Uu_DL_RSRP+sidelink_Tx−Tx Power.

For example, the first rule may be that the interference value is less than an interference threshold. Alternatively, the first rule may be that the interference value is less than or equal to an interference threshold. Alternatively, the first rule may be that the interference value is within a preset range.

The interference threshold may be carried in the scheduling information. Alternatively, the interference threshold may be configured by the network device by using higher layer signaling (for example, RRC signaling). In the foregoing manner, the interference threshold may be dynamically indicated by the network device to the terminal device, so that the network device may dynamically adjust the interference threshold based on a requirement. For example, the network device may dynamically adjust the interference threshold based on the priority of the scheduled uplink data. Compared with a fixed interference threshold, the foregoing manner may flexibly control a resource multiplexing status of the Uu transmission and the sidelink transmission.

Alternatively, the interference threshold may be determined based on a first priority and a second priority, and the first priority is a priority of uplink data transmitted in the first time-frequency resource. For example, when a delay requirement of the uplink data is relatively high, the first priority is relatively high, and when the delay requirement of the uplink data is relatively low, the first priority is relatively low. For another example, when importance of the uplink data is relatively high, the first priority is relatively high, and when the importance of the uplink data is relatively low, the first priority is relatively low. The second priority is a priority of sidelink data sent by the sending device to the receiving device. For example, when a delay requirement of the sidelink data is relatively high, the second priority is relatively high, and when the delay requirement of the sidelink data is relatively low, the second priority is relatively low. For another example, when importance of the sidelink data is relatively high, the second priority is relatively high, and when the importance of the sidelink data is relatively low, the second priority is relatively low. The terminal device may select a relatively low interference threshold when the priority of the uplink data is relatively high, so that transmission of the uplink data can be preferentially ensured. The terminal device may select a relatively high interference threshold when the priority of the sidelink data is relatively high, so that transmission of the sidelink data can be ensured.

In an implementation, the sending device may search for an interference threshold in a preconfigured interference threshold table by using the interference threshold table based on the first priority and the second priority. The interference threshold table may be configured by the network device by using higher layer signaling (for example, RRC signaling), or may be preconfigured, for example, specified in a standard protocol.

In an example description, the interference threshold table may be shown in Table 1. In Table 1, that a lower value of a priority parameter indicates a lower priority is used as an example for description.

TABLE 1

| First priority | Second priority | Interference threshold |
|---|---|---|
| 1 | 1 | −90 dBm |
| 1 | 2 | −85 dBm |
| 1 | 3 | −80 dBm |
| 2 | 1 | −95 dBm |
| 2 | 2 | −90 dBm |
| 2 | 3 | −85 dBm |
| . . . | . . . | . . . |

For example, when the first priority is 1 and the second priority is 3, the interference threshold may be determined as −80 dBm through lookup according to Table 1.

It should be understood that the first priority, the second priority, a value of the interference threshold, and a correspondence among the first priority, the second priority, and the value of the interference threshold are merely example descriptions in Table 1. In specific implementation, the first priority, the second priority, and the interference threshold may alternatively be other values, or have another correspondence. This is not specifically limited herein.

In another example description, the interference threshold table may alternatively be shown in Table 2. In Table 2, a difference between the first priority and the second priority may be a difference obtained after the second priority is subtracted from the first priority.

TABLE 2

| Difference between the first priority and the second priority | Interference threshold |
|---|---|
| −2 | −80 dBm |
| −1 | −85 dBm |
| 0 | −90 dBm |
| 1 | −95 dBm |
| . . . | . . . |

For example, when the difference between the first priority and the second priority is equal to −1, the interference threshold may be determined as −85 dBm through lookup according to Table 2.

It should be understood that the difference between the first priority and the second priority, the value of the interference threshold, and a correspondence between the value of the interference threshold and the difference between the first priority and the second priority are merely example descriptions in Table 2. In specific implementation, the difference between the first priority and the second priority and the interference threshold may alternatively be other values, or have another correspondence. This is not specifically limited herein.

In still another example description, the interference threshold table may alternatively be shown in Table 3. In Table 3, a difference between the first priority and the second priority may be a difference obtained after the second priority is subtracted from the first priority.

TABLE 3

| Range of the difference between the first priority and the second priority | Interference threshold |
|---|---|
| [−2, −1) | −80 dBm |
| [−1, 0) | −85 dBm |
| [0, 1) | −90 dBm |
| [1, 2) | −95 dBm |
| . . . | . . . |

For example, when the difference between the first priority and the second priority is within a range [0,1), the interference threshold may be determined as −90 dBm through lookup according to Table 3.

It should be understood that the range of the difference between the first priority and the second priority, the value of the interference threshold, and a correspondence between the value of the interference threshold and the range of the difference between the first priority and the second priority are merely example descriptions in Table 3. In specific implementation, the range of the difference between the first priority and the second priority and the interference threshold may alternatively be other values, or have another correspondence. This is not specifically limited herein.

In an implementation, the network device may group a terminal device that has a capability of performing resource multiplexing on the first time-frequency resource of the Uu transmission, and may add an identifier of one or more terminal device groups to the GC-PDCCH. The identifier may indicate a terminal device group that can multiplex the first time-frequency resource. The terminal device in the terminal device group corresponding to the identifier can multiplex, for the sidelink transmission by using the method provided in this embodiment of this application, the first time-frequency resource of the Uu transmission. Therefore, the terminal device can multiplex, for the sidelink transmission, the first time-frequency resource of the Uu transmission when the interference value to the network device during sending of the sidelink signal meets the first rule and the GC-PDCCH sent by the network device carries an identifier of the terminal device group in which the first terminal device is located.

Figure 5:
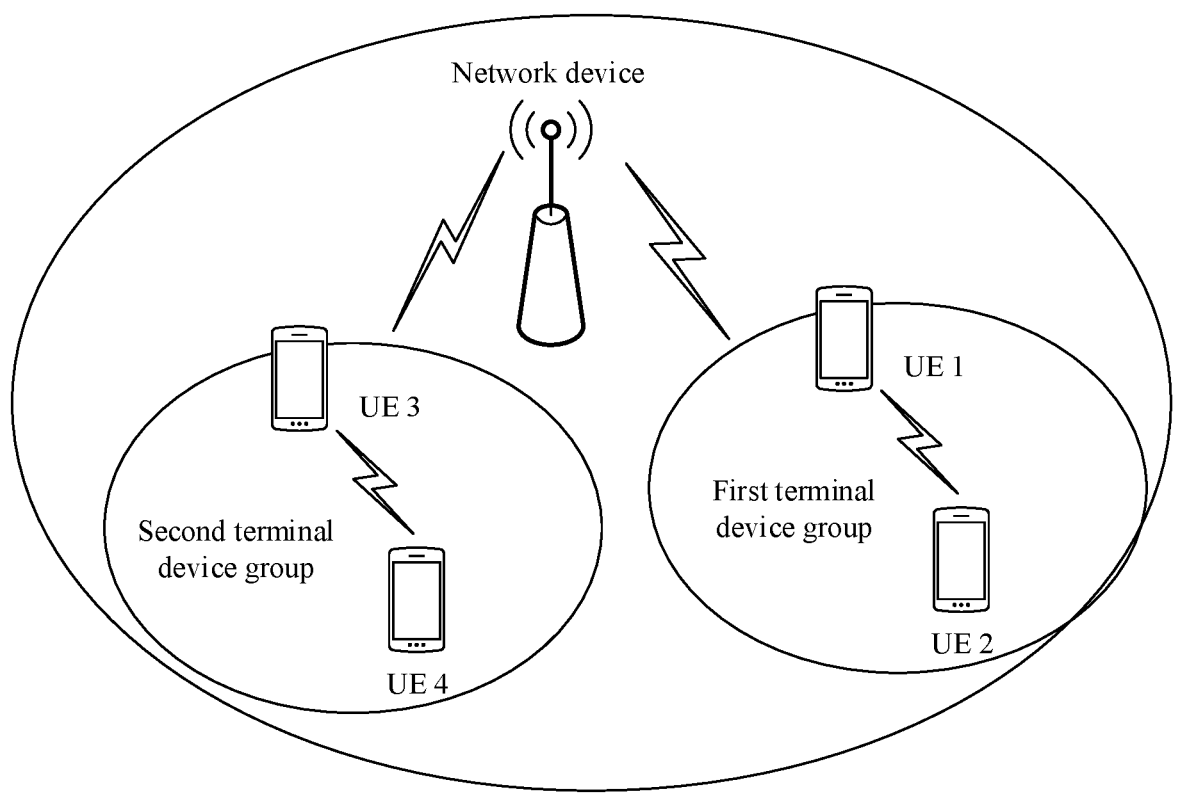
FIG. 5 is a schematic diagram of a terminal device group according to this application.
Figure 6:
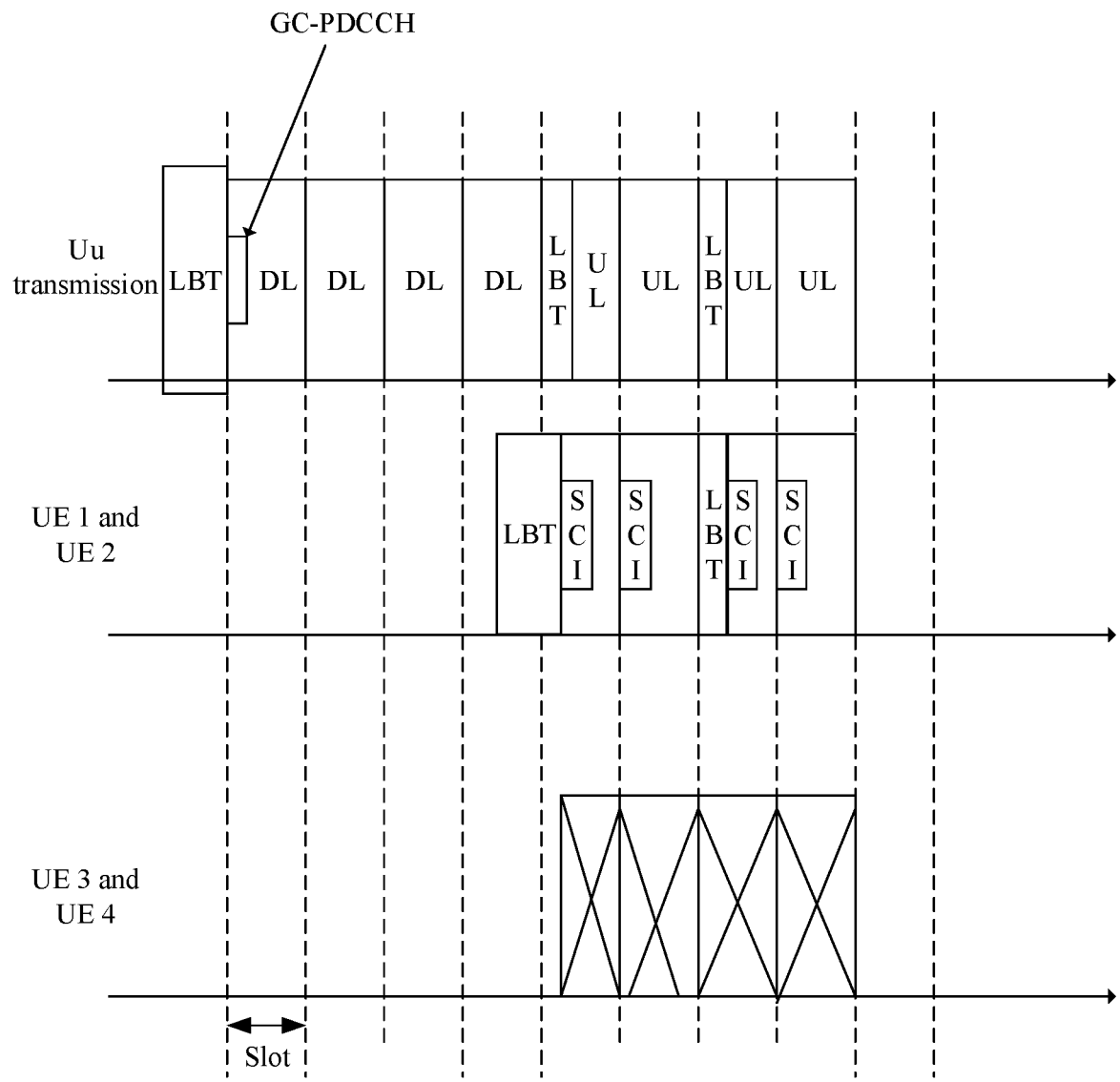
FIG. 6 is a schematic diagram of resource multiplexing according to this application.

For example, as shown in FIG. 5, the network device groups terminal devices UE 1 to UE 4, where the UE 1 and the UE 2 form a first terminal device group, and the UE 3 and the UE 4 form a second terminal device group. The network device adds an identifier of the first terminal device group to the GC-PDCCH, and the identifier is used to indicate that the first terminal device group can multiplex, for the sidelink transmission, the first time-frequency resource of the Uu transmission. After detecting the GC-PDCCH, the UE 1 and the UE 2 can multiplex, for the sidelink transmission by using the method provided in this embodiment of this application, the first time-frequency resource of the Uu transmission. After detecting the GC- PDCCH, the UE 3 and the UE 4 cannot multiplex, for the sidelink transmission by using the method provided in this embodiment of this application, the first time-frequency resource of the Uu transmission. This is shown in FIG. 6.

In an implementation, the network device may perform grouping based on a priority of a terminal device, for example, terminal devices whose priorities are within a range of 0 to 3 belong to the first terminal device group, and terminal devices whose priorities are within a range of 4 to 6 belong to the second terminal device group.

Certainly, the network device may alternatively group the terminal devices in another manner. This is not limited herein.

In the foregoing implementation method, a quantity of terminal devices that multiplex, for the sidelink transmission, the first time-frequency resource of the Uu transmission may be controlled, so that the following problem may be avoided: The network device receives incorrect uplink data due to interference superposition that is caused by an excessive quantity of terminal devices that multiplex, for the sidelink transmission, the first time-frequency resource of the Uu transmission.

In another implementation, the network device may alternatively add a priority indication to the GC-PDCCH. Therefore, when determining that a priority of the sending device meets the second rule, the sending device can multiplex, for the sidelink transmission by using the method provided in this embodiment of this application, the first time-frequency resource of the Uu transmission. To be specific, when the priority of the sending device meets the second rule, and the interference value to the network device during sending of the sidelink signal meets the first rule, the sending device can multiplex, for the sidelink transmission, the first time-frequency resource of the Uu transmission.

For example, the second rule may be that the priority of the sending device is greater than or equal to the priority indication. Alternatively, the second rule may be that the priority of the sending device is greater than the priority indication.

For example, the priority of the sending device may be a device priority of the sending device, or may be a priority of data transmitted by the sending device to the receiving device.

The device priority may be determined based on one or more of the following factors: a priority of a service transmitted through a sidelink by the terminal device; a geographical location of the terminal device; or a communication fee of the terminal device.

In an example description, a device priority of the terminal device may be related to the priority of the service transmitted through the sidelink by the terminal device. For example, a terminal device for a service whose delay requirement is relatively high has a relatively high priority, for example, a terminal device for an ultra-reliable and low latency communication (URLLC) service has a relatively high priority. A terminal device for a service whose delay requirement is relatively low has a relatively low priority, for example, a terminal device for an enhanced mobile broadband (MBB) service has a relatively low priority. Therefore, the priority of the terminal device that transmits the URLLC service is higher than the priority of the terminal device that transmits the MBB service.

In another example description, a device priority of the terminal device may alternatively be related to the geographical location of the terminal device. For example, a terminal device closer to the network device has a higher priority, and a terminal device farther from the network device has a lower priority.

In still another example description, a device priority of the terminal device may alternatively be related to the communication fee. For example, a higher communication fee of the terminal device indicates a higher device priority of the terminal device, and a lower communication fee of the terminal device indicates a lower device priority of the terminal device.

Certainly, the priority of the terminal device may alternatively be related to other information. This is not limited herein.

For example, the priority of the data transmitted by the sending device to the receiving device may be determined based on a delay requirement of the data. For example, a priority of data with a relatively high delay requirement is relatively high, for example, a priority of URLLC service data is relatively high. A priority of data with a relatively low delay requirement is relatively low, for example, a priority of MBB service data is relatively low. Therefore, the priority of the URLLC service data is higher than the priority of the MMB service data.

In the foregoing implementation method, a quantity of terminal devices that multiplex, for the sidelink transmission, the time-frequency resource of the Uu transmission may be controlled, so that the following problem may be avoided: The network device receives incorrect uplink data due to interference superposition that is caused by an excessive quantity of terminal devices that multiplex, for the sidelink transmission, the time-frequency resource of the Uu transmission. In addition, sidelink transmission of a terminal device with a relatively high priority may be further ensured to some extent.

Figure 7:
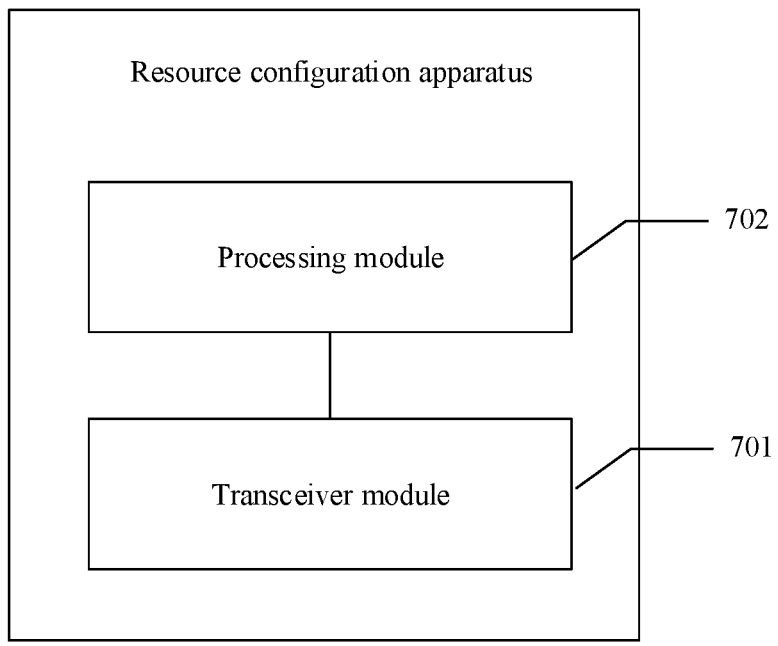
FIG. 7 is a schematic diagram of a structure of a resource configuration apparatus according to this application.

An embodiment of this application provides a resource configuration apparatus. The resource configuration apparatus may be specifically configured to implement the method performed by the first terminal device in the embodiments of FIG. 3 to FIG. 6. The apparatus may be the first terminal device itself, or may be a chip or a chip set in the first terminal device, or a part of the chip that is used to perform a related method function. A structure of the resource configuration apparatus may be shown in FIG. 7, including a transceiver module 701 and a processing module 702. The transceiver module 701 is configured to: receive scheduling information sent by a network device, where the scheduling information is used to indicate an uplink time-frequency resource; and send a sidelink signal to a second terminal device on the uplink time-frequency resource when an interference value to the network device during sending of the sidelink signal meets a first rule.

For example, the interference value may be determined based on an attenuation amount of a channel between the network device and a first terminal device and a transmit power for sending the sidelink signal by the transceiver module 701.

For example, the attenuation amount of the channel between the network device and the first terminal device may be determined based on a transmit power of the network device and a downlink received signal power of the apparatus. The downlink received signal power is obtained through measurement based on a DMRS corresponding to the scheduling information.

In an example description, the first rule may be that the interference value is less than an interference threshold.

The interference threshold may be carried in the scheduling information.

Alternatively, the interference threshold may be determined based on a first priority and a second priority, the first priority is a priority of uplink data transmitted on the uplink time-frequency resource, and the second priority is a priority of sidelink data sent by the transceiver module 701 to the second terminal device.

In a possible implementation, the uplink time-frequency resource is on an unlicensed frequency band. The transceiver module 701 may be specifically configured to: when sending the sidelink signal to the second terminal device on the uplink time-frequency resource, send the sidelink signal to the second terminal device on the uplink time-frequency resource after LBT succeeds on the uplink time-frequency resource.

The first terminal device is located in one or more terminal device groups, and the scheduling information may carry an identifier of one or more terminal device groups, where the identifier is used to indicate a terminal device group that multiplexes the uplink time-frequency resource.

The transceiver module 701 is specifically configured to: when sending the sidelink signal to the second terminal device on the uplink time-frequency resource, send the sidelink signal to the second terminal device on the uplink time-frequency resource when the interference value to the network device during sending of the sidelink signal meets the first rule and a priority of the first terminal device meets a second rule.

The priority of the first terminal device may be a device priority of the first terminal device, and the device priority is determined based on one or more of the following factors: a priority of a service transmitted through a sidelink by the terminal device; a geographical location of the terminal device; and a communication fee of the terminal device.

Alternatively, the priority of the first terminal device may be a priority of data transmitted by the first terminal device to the second terminal device.

For example, the scheduling information may carry a priority indication. The second rule may be that the priority of the first terminal device is greater than or equal to the priority indication.

Optionally, a frame structure of the uplink time-frequency resource is not fixed.

Division into modules in embodiments of this application is an example, is merely logical function division, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 8:
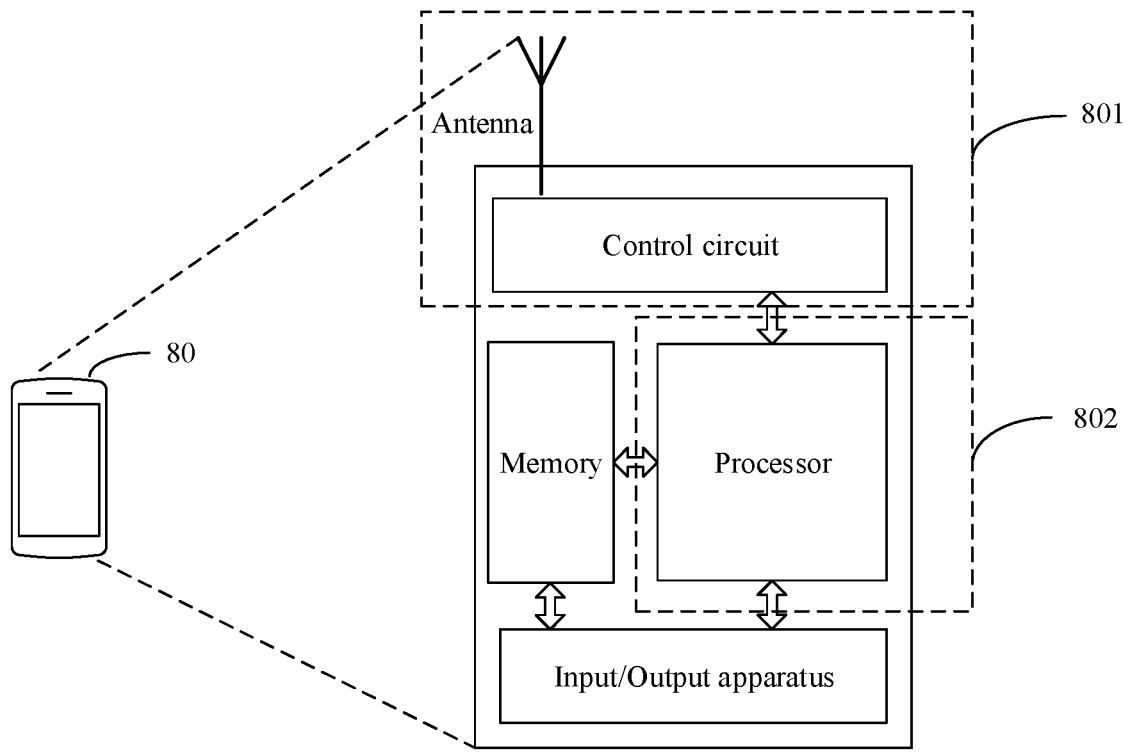
FIG. 8 is a schematic diagram of a structure of a terminal device according to this application.

FIG. 8 is a schematic diagram of a structure of a terminal device according to an embodiment of this application. The terminal device is applicable to the system shown in FIG. 1, and performs a function of the first terminal device in the foregoing method embodiment. For ease of description, FIG. 8 shows only main components of the terminal device. As shown in FIG. 8, the terminal device 80 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing method embodiment, for example, support a first terminal device in receiving scheduling information sent by a network device, where the scheduling information is used to indicate an uplink time-frequency resource; and control the first terminal device to send a sidelink signal to a second terminal device on the uplink time-frequency resource when an interference value to the network device during sending of the sidelink signal meets a first rule. The memory is mainly configured to store the software program and the data. The control circuit is mainly configured to: perform conversion between a baseband signal and a radio frequency signal, and process the radio frequency signal. The control circuit and the antenna may alternatively be collectively referred to as a transceiver, and may be mainly configured to transmit/receive a radio frequency signal in a form of an electromagnetic wave, for example, may be configured to: receive, under control of the processor, the scheduling information sent by the network device, where the scheduling information is used to indicate the uplink time-frequency resource; and send the sidelink signal to the second terminal device on the uplink time-frequency resource when the interference value to the network device during sending of the sidelink signal meets the first rule. The input/output apparatus, for example, a touchscreen, a display, or a keyboard, is mainly configured to: receive data entered by a user, and output data to the user.

After the terminal device is powered on, the processor may read the software program in the memory, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in embodiments of this application.

In an optional implementation, the terminal device may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 8. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be described as a baseband processing circuit or a baseband processing chip. The central processing unit may also be described as a central processing circuit or a central processing chip. A function of processing the communication protocol and the communication data may be built in the processor, or may be stored in the memory in a form of a software program. The processor executes the software program to implement a baseband processing function.

In embodiments of this application, the antenna and the control circuit that have receiving and sending functions may be considered as a transceiver unit 801 of the terminal device 80, for example, configured to support the terminal device in performing the receiving function and the sending function. The processor 802 having a processing function is considered as a processing unit 802 of the terminal device 80. As shown in FIG. 8, the terminal device 80 includes the transceiver unit 801 and the processing unit 802. The transceiver unit may also be referred to as a transceiver, a transceiver machine, a transceiver apparatus, or the like. Optionally, a component configured to implement a receiving function in the transceiver unit 801 may be considered as a receiving unit. A component configured to implement a sending function in the transceiver unit 801 may be considered as a sending unit. That is, the transceiver unit 801 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processor 802 may be configured to execute instructions stored in the memory, so as to control the transceiver unit 801 to receive a signal and/or send a signal, and complete a function of the terminal device in the foregoing method embodiment. Specifically, the processor 802 may implement a function of the processing module 702 shown in FIG. 7. For a specific function, refer to related descriptions of the processing module 702. Details are not described herein again. The processor 802 further includes an interface, configured to implement a signal input/output function. In an implementation, a function of the transceiver unit 801 may be implemented by using a transceiver circuit or a dedicated transceiver chip. The transceiver unit 801 may implement a function of the transceiver module 701 shown in FIG. 7. For a specific function, refer to related descriptions of the transceiver module 701. Details are not described herein again.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of this application may be provided methods, systems, or computer program products. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, and computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the spirit and scope of embodiments of this application. In this case, this application is intended to cover these modifications and variations of embodiments of this application provided that they fall within the scope of protection defined by the following claims and their equivalent technologies.

What is claimed is:

1. A resource configuration method comprising:
   receiving, by a first terminal device, scheduling information sent by a network device, wherein the scheduling information indicates an uplink time-frequency resource for universal user (Uu) and device-to-device (sidelink) transmission; and
   multiplexing sending, by the first terminal device, a Uu transmission and a sidelink to the network device and a second terminal device, respectively, on the uplink time-frequency resource, in response to an interference value of the Uu transmission to the network device meeting a first rule,
   wherein the interference value is based on an amount of attenuation in a channel between the network device and the first terminal device and a transmit power for sending the sidelink signal by the first terminal device,
   wherein the amount of attenuation of the channel is based on a transmit power of the network device and a downlink received signal power of the first terminal device, and wherein the downlink received signal power is obtained from a measurement of a demodulation reference signal (DMRS) associated with the scheduling information.

2. The method according to claim 1, wherein the first rule is that the interference value is less than an interference threshold.

3. The method according to claim 2, wherein the interference threshold is carried in the scheduling information.

4. The method according to claim 2, wherein the interference threshold is determined based on a first priority and a second priority, wherein the first priority is a priority of uplink data transmitted on the uplink time-frequency resource, and wherein the second priority is a priority of sidelink data sent by the first terminal device to the second terminal device.

5. The method according to claim 1, wherein the uplink time-frequency resource is on an unlicensed frequency band, and sending, by the first terminal device, the sidelink to the second terminal device on the uplink time-frequency resource comprises:
sending, by the first terminal device, the sidelink to the second terminal device on the uplink time-frequency resource after listen before talk (LBT) succeeds on the uplink time-frequency resource.

6. The method according to claim 1, wherein the first terminal device is located in one or more terminal device groups, wherein the scheduling information carries an identifier of the one or more terminal device groups, and wherein the identifier indicates a terminal device group that multiplexes the uplink time-frequency resource.

7. The method according to claim 1, wherein sending, by the first terminal device, the sidelink signal to the second terminal device on the uplink time-frequency resource in response to the interference value to the network device during sending of the sidelink meeting the first rule comprises:
sending, by the first terminal device, the sidelink to the second terminal device on the uplink time-frequency resource in response to the interference value to the network device during sending of the sidelink meeting the first rule and a priority of the first terminal device meeting a second rule.

8. A resource configuration apparatus comprising:
a processor; and
a memory coupled to the processor and having processor-readable instructions stored thereon, which are executed by the processor and cause the apparatus to:
receive scheduling information sent by a network device, wherein the scheduling information indicates an uplink time-frequency resource for universal user (Uu) and device-to-device (sidelink) transmission; and
multiplex sending a Uu transmission and a sidelink to the network device and a second terminal device, respectively, on the uplink time-frequency resource, in response to an interference value of the Uu transmission to the network device meeting a first rule,
wherein the interference value is based on an amount of attenuation in a channel between the network device and the first terminal device and a transmit power for sending the sidelink signal by the first terminal device,
wherein the amount of attenuation of the channel is based on a transmit power of the network device and a downlink received signal power of the first terminal device, and
wherein the downlink received signal power is obtained from a measurement of a demodulation reference signal (DMRS) associated with the scheduling information.

9. The apparatus according to claim 8, wherein the first rule is that the interference value is less than an interference threshold.

10. The apparatus according to claim 9, wherein the interference threshold is carried in the scheduling information.

11. The apparatus according to claim 9, wherein the interference threshold is determined based on a first priority and a second priority, wherein the first priority is a priority of uplink data transmitted on the uplink time-frequency resource, and wherein the second priority is a priority of sidelink data sent by the apparatus to the second terminal device.

12. The apparatus according to claim 8, wherein the uplink time-frequency resource is on an unlicensed frequency band, and the instruction of sending the sidelink to the second terminal device on the uplink time-frequency resource further includes:
sending the sidelink to the second terminal device on the uplink time-frequency resource after listen before talk (LBT) succeeds on the uplink time-frequency resource.

13. The apparatus according to claim 8, wherein the first terminal device is located in one or more terminal device groups, wherein the scheduling information carries an identifier of the one or more terminal device groups, and wherein the identifier indicates a terminal device group that multiplexes the uplink time-frequency resource.

14. The apparatus according to claim 8, wherein the instruction of sending the sidelink to the second terminal device on the uplink time-frequency resource further includes:
sending the sidelink to the second terminal device on the uplink time-frequency resource in response to the interference value to the network device during sending of the sidelink meeting the first rule and a priority of the first terminal device meeting a second rule.

15. The apparatus according to claim 8, wherein the apparatus is a chip or a first terminal device.

16. A non-transitory computer-readable storage medium, storing computer-executable instructions, that are read and executed by one or more processors of a first terminal device, and cause the one or more processors to implement a resource configuration method comprising:
receiving, scheduling information sent by a network device, wherein the scheduling information indicates an uplink time-frequency resource for universal user (Uu) and device-to-device (sidelink) transmission; and
multiplexing sending a Uu transmission and a sidelink to the network device and a second terminal device, respectively, on the uplink time-frequency resource, in response to an interference value of the Uu transmission to the network device meeting a first rule,
wherein the interference value is based on an amount of attenuation in a channel between the network device and the first terminal device and a transmit power for sending the sidelink signal by the first terminal device, wherein the amount of attenuation of the channel is based on a transmit power of the network device and a downlink received signal power of the first terminal device, and wherein the downlink received signal power is obtained from a measurement of a demodulation reference signal (DMRS) associated with the scheduling information.

17. The non-transitory computer-readable storage medium according to claim 16 including further computer-executable instructions, that are read and executed by the one or more processors of the first terminal device, and further cause the one or more processors to implement a resource configuration method wherein the first rule is that the interference value is less than an interference threshold.

18. The non-transitory computer-readable storage medium according to claim 16 including further computer-executable instructions, that are read and executed by the one or more processors of the first terminal device, and further cause the one or more processors to implement a resource configuration method wherein the uplink time-frequency resource is on an unlicensed frequency band, and sending the sidelink to the second terminal device on the uplink time-frequency resource comprises:

sending, by the first terminal device, the sidelink to the second terminal device on the uplink time-frequency resource after listen before talk (LBT) succeeds on the uplink time-frequency resource.

19. The non-transitory computer-readable storage medium according to claim 16 including further computer-executable instructions, that are read and executed by the one or more processors of the first terminal device, and further cause the one or more processors to implement a resource configuration method wherein the first terminal device is located in one or more terminal device groups, wherein the scheduling information carries an identifier of the one or more terminal device groups, and wherein the identifier indicates a terminal device group that multiplexes the uplink time-frequency resource.

20. The non-transitory computer-readable storage medium according to claim 16 including further computer-executable instructions, that are read and executed by the one or more processors of the first terminal device, and further cause the one or more processors to implement a resource configuration method wherein sending the sidelink to the second terminal device on the uplink time-frequency resource in response to the interference value to the network device during sending of the sidelink meets the first rule and a priority of the first terminal device meets a second rule.

* * * * *